UNITED STATES PATENT OFFICE.

RUPERT GREVILLE-WILLIAMS, OF ALBANY, NEW YORK, ASSIGNOR TO THE ALBANY COAL TAR DYE AND CHEMICAL COMPANY, OF SAME PLACE.

PROCESS OF MAKING AZO DYES.

SPECIFICATION forming part of Letters Patent No. 416,145, dated November 26, 1889.

Application filed August 6, 1889. Serial No. 319,903. (No specimens.)

*To all whom it may concern:*

Be it known that I, RUPERT GREVILLE-WILLIAMS, a citizen of Great Britain, and a resident of the city of Albany, in the county of Albany and State of New York, have invented certain new and useful Improvements in the Manufacture of Mixed Azo Colors; and I do hereby declare that the following is a full, clear, and exact description of the invention, which will enable others skilled in the art to which it appertains to make and use the same.

It is well known that insoluble "intermediate" bodies formed by the combination of one molecule of a tetrazo compound with one molecule of a naphthylamine, or a sulpho-acid of a naphthylamine, can be converted into soluble coloring-matter by reacting on them with another molecule of a different amine or with a phenol.

I have now found that a new class of intermediate bodies can be obtained by combining one molecule of naphthaline-azo-naphthylamine, or sulpho-acids of the same, with one molecule of a tetrazo compound, and that these intermediate bodies can be converted into new and useful coloring-matters by reacting on them with another molecule of one of the naphthylamines or a sulpho-acid of the same.

The following are examples of how I carry out my process practically:

*Example 1.*—Twenty-five pounds of naphthionate of soda are dissolved in fifty gallons of water, and thirty pounds of muriatic acid, 22° Baumé, are added. The precipitated free naphthionic acid is cooled with ice, and seven pounds of nitrite of soda, dissolved in five times its weight of water, are run very slowly in. When the azotization is complete, twenty-five pounds more naphthionate of soda, dissolved in twenty gallons of water, are added, and then fifteen pounds of acetate of soda. The mixture is stirred until the molecule of free naphthionic acid is combined with the molecule of azo-naphthaline sulpho-acid. The reaction is complete when the whole product is transformed into a clear, bright, scarlet solution. The alpha-naphthaline sulpho-acid azo-alpha-naphthylamine sulpho-acid thus produced (which is a wool dye-stuff in itself) is allowed to react in presence of acetate of soda on the tetrazoditolyl formed in the usual manner by diazotizing thirty-two pounds of toluidine sulphate, or its equivalent of the base, with fourteen pounds of nitrite of soda. As soon as the tretrazo compound is all combined, twenty-five pounds of naphthionate of soda, dissolved in about sixty gallons of water, are added. The color is formed very slowly, and should be stirred for several days. The completion of the reaction is ascertained when dye-tests show no improvement. The temperature is then raised to boiling-point, and enough soda-lye added to convert the color into its soda salt. It is then precipitated with common salt, filtered off, pressed, and dried. The color dyes unmordanted cotton a bright red in an alkaline or soap bath, and is fast to washing. The shade is similar to that of the color commercially known as "benzo-purpurine 4 B.," and has the following formula:

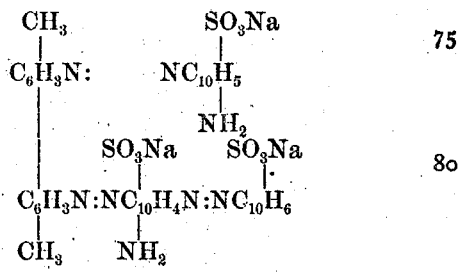

If the azo-naphthaline sulpho-acid is combined with the naphthionic acid (to produce the before-mentioned alpha-naphthaline monosulpho-acid azo-alpha-naphthylamine monosulpho-acid) in presence of caustic soda, instead of acetate of soda, a similar body is obtained.

*Example 2.*—The intermediate product produced in the same manner as given in Example 1 is reacted upon with twenty-five pounds of beta-naphthylamine monosulpho-acid soda salt in the place of the naphthionic acid.

By tetrazo bodies I mean the following: tretrazo-diphenyl and its homologues, tetrazo-naphthaline, tetrazo-stilbene, tetrazo-fluor- )-diphenolether, tetrazo-azo benzole omologues, tetrazo-oxydiphenyl, as alkalized compounds, or the carbo acids of the same.

now described my invention, what d desire to secure by Letters Paterein-described process for the pro- new azo coloring-matters, which nsists in combining one molecule the herein-mentioned tetrazo com- th one molecule of the herein-de- aphthaline-azo-naphthylamine or compounds, and afterward acting ermediate body thus formed with ule of one of the naphthylamines acids of the same, substantially as 2. The process for producing new coloring-matters by reversing the process in claim 1, by combining the tetrazo body first with one molecule of one of the naphthylamines or sulpho-acids of the same, and then reacting on the intermediate thus produced with the herein-described naphthaline-azo-naphthyl-amine or sulpho-acids of the same, substantially as set forth.

Signed at Albany, in the county of Albany and State of New York, this 27th day of July, A. D. 1888:

RUPERT GREVILLE-WILLIAMS.

Witnesses:
  R. A. SHAW,
  JOHN J. VAN SCHOONHOVEN.

Corrections in Letters Patent No. 416,145.

It is hereby certified that in Letters Patent No. 416,145, granted November 26, 1889, upon the application of Rupert Greville-Williams, of Albany, New York, for an improvement in "Process of Making Azo Dyes," errors appear in the printed specification requiring correction, as follows: In line 55, page 1, the word "toluidine" should read *tolidine*, and the formula following line 73, page 1, should read—

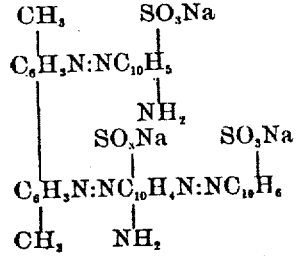

and the said Letters Patent should be read with these corrections therein that the same may conform to the record of the case in the Patent Office.

Signed, countersigned and sealed this 10th day of December, A. D. 1889.

[SEAL.]

CYRUS BUSSEY,
*Assistant Secretary of the Interior.*

Countersigned:
C. E. MITCHELL,
*Commissioner of Patents.*

It is hereby certified that in Letters Patent No. 416,145, granted November 26, 1889, upon the application of Rupert Greville-Williams, of Albany, New York, for an improvement in the "Process of Making Azo-Dyes," an error appears in the printed specification requiring the following correction, viz: In line 3, page 2, the word "alkalized" should read *alkylized;* and that the said Letters Patent should be read with this correction therein that the same may conform to the record of the case in the Patent Office.

Signed, countersigned, and sealed this 28th day of January, A. D. 1890.

[SEAL.]

CYRUS BUSSEY.
*Assistant Secretary of the Interior.*

Countersigned:

C. E. MITCHELL,
*Commissioner of Patents.*